US012793192B2

(12) United States Patent
Lindgren

(10) Patent No.: US 12,793,192 B2
(45) Date of Patent: Nov. 10, 2026

(54) TONE MAPPING CONTROL WITH WINDSHIELD WIPER DETECTION

(71) Applicant: QUALCOMM Incorporated, San Diego, CA (US)

(72) Inventor: Leif Ove Lindgren, Linkoping (SE)

(73) Assignee: QUALCOMM Incorporated, San Diego, CA (US)

(*) Notice: Subject to any disclaimer, the term of this patent is extended or adjusted under 35 U.S.C. 154(b) by 170 days.

(21) Appl. No.: 18/943,320

(22) Filed: Nov. 11, 2024

(65) Prior Publication Data

US 2026/0134526 A1 May 14, 2026

(51) Int. Cl.

| | |
|---|---|
| ***G06T 5/92*** | (2024.01) |
| ***G06T 5/40*** | (2006.01) |
| ***G06T 5/50*** | (2006.01) |
| ***G06V 20/56*** | (2022.01) |
| ***H04N 23/71*** | (2023.01) |
| ***H04N 23/745*** | (2023.01) |

(52) U.S. Cl.

CPC .................. *G06T 5/92* (2024.01); *G06T 5/40* (2013.01); *G06T 5/50* (2013.01); *G06V 20/56* (2022.01); *H04N 23/745* (2023.01); *G06T 2207/20076* (2013.01); *G06T 2207/30252* (2013.01); *H04N 23/71* (2023.01)

(58) Field of Classification Search

CPC .... G06T 5/92; G06T 5/40; G06T 5/50; G06T 2207/20076; G06T 2207/30252; G06T 2207/10016; G06V 20/56; G06V 10/62; H04N 23/745; H04N 23/71

See application file for complete search history.

(56) References Cited

U.S. PATENT DOCUMENTS

| | | | | |
|---|---|---|---|---|
| 11,064,131 | B1 | 7/2021 | Aluru | |
| 2011/0043624 | A1 | 2/2011 | Haug | |
| 2016/0232423 | A1 * | 8/2016 | Zhong ................ | B60H 1/00735 |
| 2024/0089618 | A1 | 3/2024 | Knutsson et al. | |

OTHER PUBLICATIONS

International Search Report and Written Opinion—PCT/US2025/053494—ISA/EPO—Jan. 22, 2026 (2405359WO).

* cited by examiner

*Primary Examiner* — Farzana Hossain
(74) *Attorney, Agent, or Firm* — QUALCOMM Incorporated

(57) ABSTRACT

This disclosure provides systems, methods, and devices for machine learning techniques that support image processing for use in a vehicle assistance system. In one aspect, a method is provided that includes receiving a first image frame captured from a camera positioned on a vehicle. The method further includes determining, based on the first image frame, a probability value that the first image frame depicts at least a portion of a windshield wiper blade. A time filter is determined based on the probability value, and an output image frame is determined by tone mapping a second image frame according to the time filter. Other aspects and features are also claimed and described.

20 Claims, 7 Drawing Sheets

TONE MAPPING CONTROL WITH WINDSHIELD WIPER DETECTION

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

The described techniques involve a method for improving the quality of images captured by vehicle cameras, particularly in the presence of windshield wipers. The process encompasses receiving an image frame from a vehicle camera, determining the probability that the frame includes a windshield wiper, and adjusting the tone mapping of future image frames based on this probability to reduce flicker and ensure stable image quality.

One aspect provides a method for image processing for use in a vehicle assistance system that includes receiving a first image frame captured from a camera positioned on a vehicle; determining, based on the first image frame, a probability value that the first image frame depicts at least a portion of a windshield wiper blade; determining a time filter based on the probability value; and determining an output image frame by tonc mapping a second image frame according to the time filter.

Another aspect provides an apparatus that includes a memory storing processor-readable code and at least one processor coupled to the memory. The at least one processor is configured to execute the processor-readable code to cause the at least one processor to perform operations including receiving a first image frame captured from a camera positioned on a vehicle; determining, based on the first image frame, a probability value that the first image frame depicts at least a portion of a windshield wiper blade; determining a time filter based on the probability value; and determining an output image frame by tone mapping a second image frame according to the time filter.

A further aspect provides a vehicle that includes a camera, a memory storing processor-readable code, and at least one processor coupled to the memory. The at least one processor is configured to execute the processor-readable code to cause the at least one processor to perform operations including receiving a first image frame captured from the camera; determining, based on the first image frame, a probability value that the first image frame depicts at least a portion of a windshield wiper blade; determining a time filter based on the probability value; and determining an output image frame by tone mapping a second image frame according to the time filter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such s "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
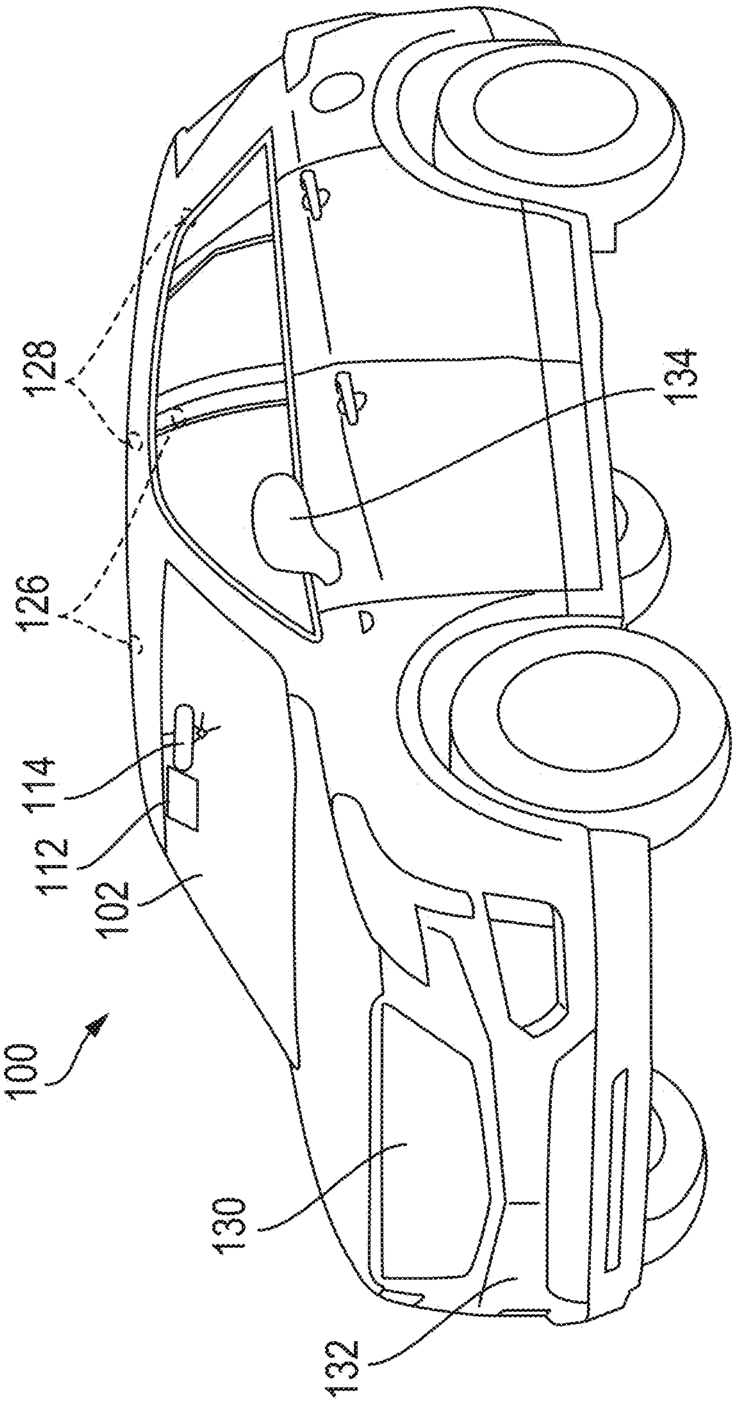
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved tone mapping and image capture. Existing techniques for vehicle cameras include dynamic tone mapping to adjust image quality based on scene brightness. These cameras, which can be used in applications for augmented reality displays and autonomous driving assistance, capture high dynamic range images that are tone mapped down to a lower bit depth for processing and display. However, when a windshield wiper occludes the camera's view, it can cause abrupt changes in image brightness. The software control loop responsible for tone mapping can react to these sudden dark areas by adjusting the image brightness excessively, which lead to noticeable flicker in the resulting output images. This flicker can be problematic for human vision applications, causing user discomfort, and for computer vision applications, which may struggle with rapidly changing image conditions.

One solution to this problem is to incorporate a method for detecting the presence of a windshield wiper in the captured image frames and adjusting the tone mapping process to account for the windshield wiper. The described techniques determine the probability of a wiper being present by comparing image statistics (such as pixel mean value or lux related values) between current and previous frames. If a high probability of wiper presence is detected, the influence of the affected frame on tone mapping is reduced. This approach ensures that frames with wiper obstruction do not cause significant changes in subsequent image brightness, thus minimizing flicker.

Stated differently, automotive cameras may be disposed behind a windshield to image a forward-facing direction. These cameras may capture approximately 20 bits of dynamic range, which an image signal processor (ISP) may tone map down to 8 bits based on scene characteristics. When windshield wipers are in use, they may be observed in 1-2 frames per second, which may affect tone mapping as these frames may be noticeably darker due to the presence of the dark blade. Current ISP systems may include a 3-frame delay, causing frame N+3, after the wipers are observed, to be too bright due to the delayed compensation for the dark blade in frame N. The time filter may then gradually return to the earlier darker tone mapping, and flicker artifacts may continue for each reoccurrence of the blade in an image. The proposed solution can modify the time filter for tone mapping control based on the detection of a wiper. If the wiper is detected, the contribution of the frame to the global tone mapping control may be reduced. Further, a confidence value of a detected windshield wiper may be applied to further adjust the contribution of local tone mapping (LTM) statistics of the given frame, potentially reducing flicker and improving image quality.

Particular implementations of the subject matter described in this disclosure may be implemented to realize one or more of the following potential advantages or benefits. In some aspects, the present disclosure provides techniques for real-time detection and adjustment of tone mapping in vehicle camera systems that may be particularly beneficial in reducing flicker caused by windshield wipers. For example, by leveraging simple image statistics to detect wiper presence, the techniques require minimal computational resources, making them efficient and easy to implement. These techniques may improve the stability of image brightness, enhancing the experience for both human viewers and computer vision algorithms. Additionally, these techniques may ensure better functioning of applications that rely on consistent image quality, such as augmented reality displays and autonomous driving systems, by providing flicker-free video output. This approach also helps in maintaining balanced lighting conditions in varying environments, improving overall image processing performance.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or in a forward direction. In some embodiments, an additional camera may be located at the rear of the vehicle 100 and oriented such that the field of view of the additional camera captures a scene behind the vehicle 100 in the direction that the vehicle 100 is moving when in reverse mode or in a reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the vehicle 100 is traveling in a forward direction may likewise be obtained while the vehicle 100 is traveling in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
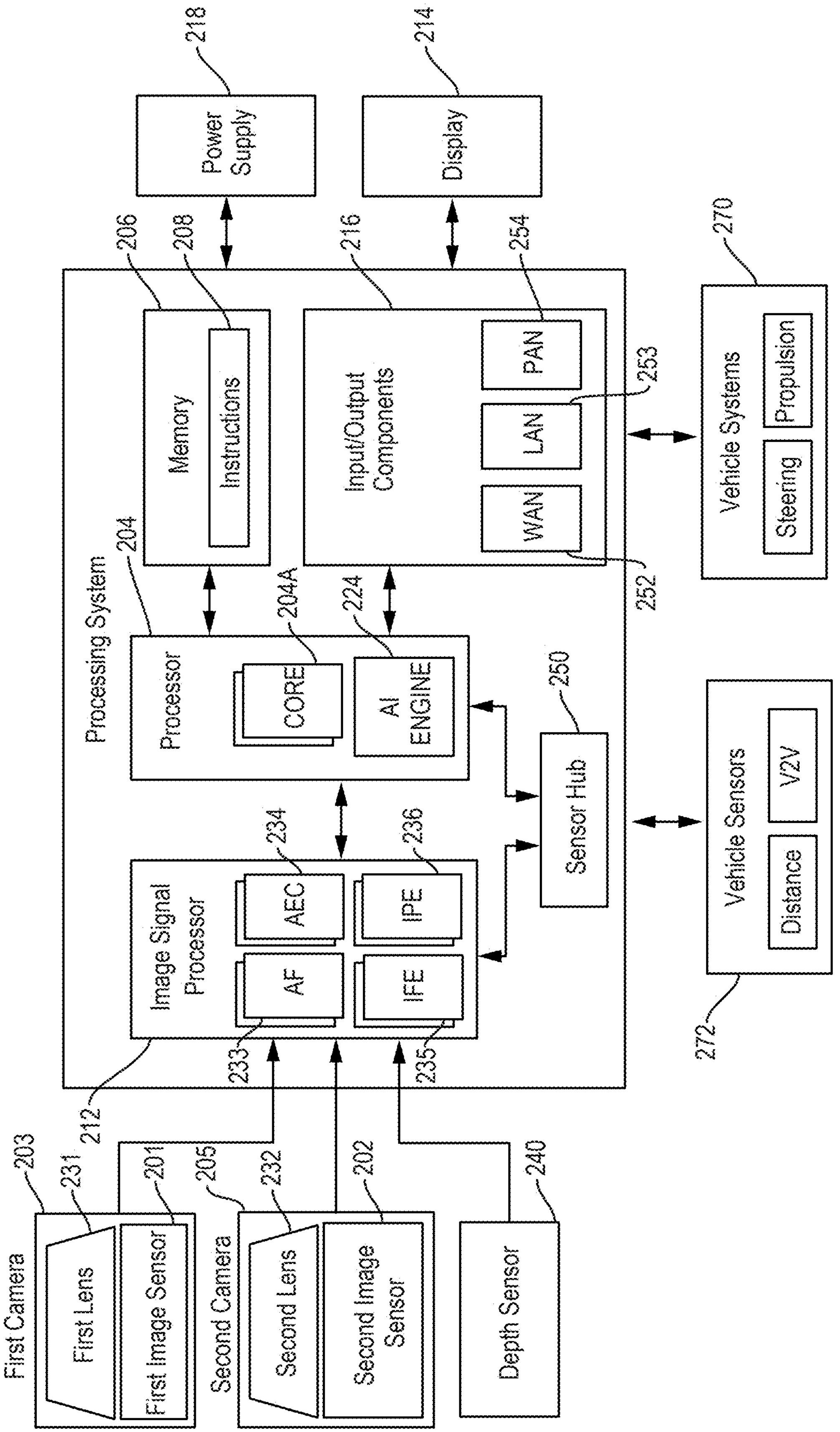
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

The vehicle 100 may communicate as a user equipment (UE) within a wireless network, such as through WAN adaptor 252. The wireless network may, for example, include a 5G wireless network.

Aspects of the vehicular systems described with reference to, and shown in, FIG. 1 and FIG. 2 may include detecting windshield wipers in captured image frames, and adjusting tone mapping to account for the detected windshield wipers.

Figure 3:
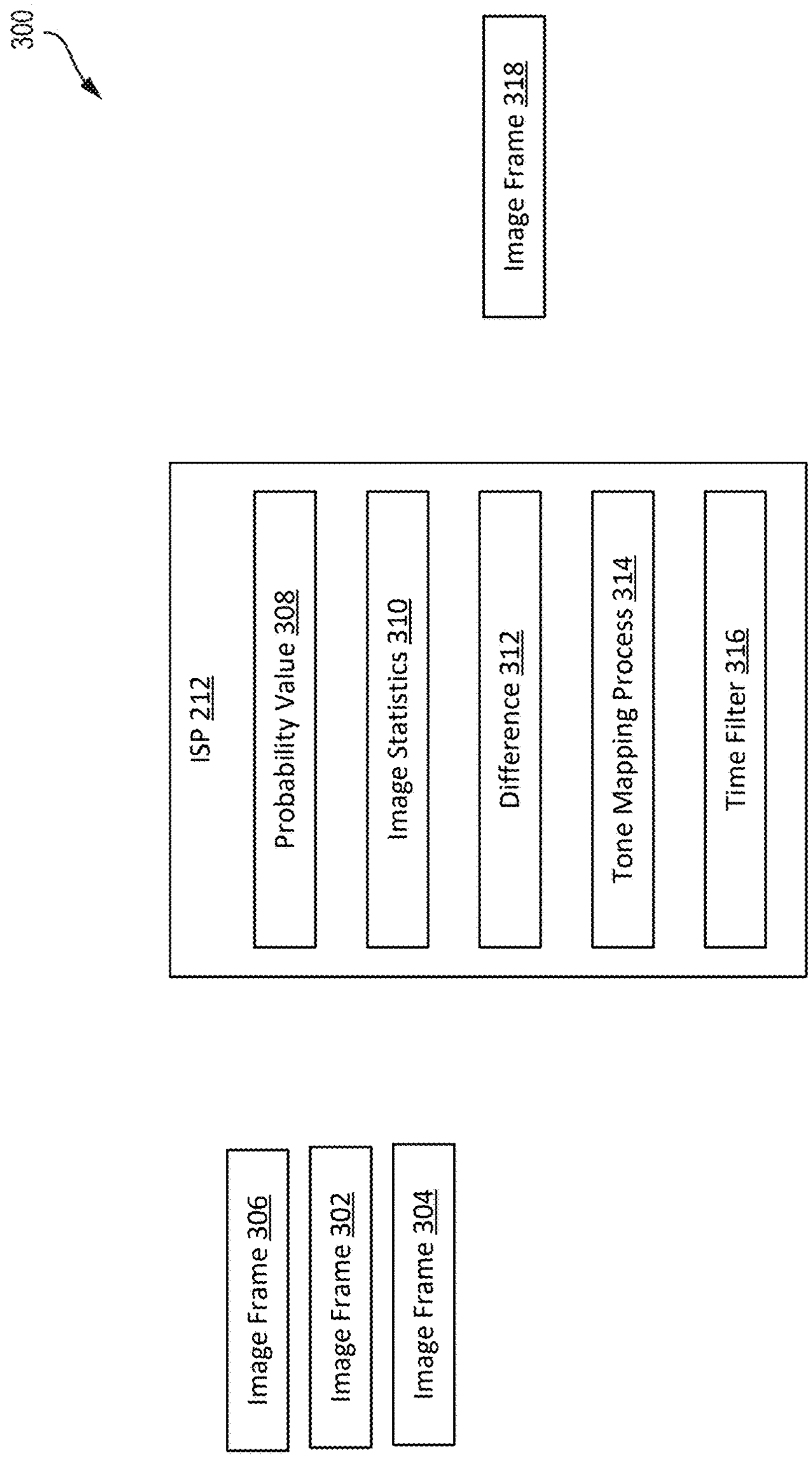
FIG. 3 is a block diagram illustrating a system for tone mapping control according to one or more aspects.

FIG. 3 is a block diagram illustrating a system 300 for tone mapping control according to one aspect of the present disclosure. The system may be an exemplary implementation of one or more systems discussed above, such as the system 200. The system 300 includes a third image frame 306, a first image frame 302, a second image frame 304, an ISP 212, an output image frame 318. The ISP 212 212 includes a probability value 308, an image statistics 310, a difference 312, a tone mapping process 314, a time filter 316.

The ISP 212 may be configured to receive a first image frame 302 captured from a camera positioned on a vehicle. In certain implementations, the first image frame 302 may be captured for an area surrounding the vehicle. For example, captured image data may be used in vehicle guidance, control, or monitoring operations, as discussed above. In certain implementations, the first image frame 302 may be captured from a camera positioned behind a window of the vehicle. For example, the camera may be positioned behind a front windshield, a rear window, or side windows.

The ISP 212 may be configured to determine, based on the first image frame 302, a probability value 308 that the first image frame 302 depicts at least a portion of a windshield wiper. In certain implementations, the probability value 308 may be determined based on the first image frame 302 and a third image frame 306 that was captured before the first image frame 302. In certain implementations, determining the probability value 308 includes determining one or more image statistics 310 for the first image frame 302 and the third image frame 306, determining a difference 312 between the one or more image statistics 310 for the first image frame 302 and the third image frame 306, and determining the probability value 308 based on the difference 312. In certain implementations, the image statistics 310 may be used to assess lighting conditions in the first image frame 302 and the third image frame 306. As explained further below, one or more of the image statistics 310 may be used by a tone mapping process 314 to ensure balanced lighting conditions for tone-mapped output image frames 318. For instance, pixel mean values may be used as a measure of lighting conditions and overall brightness conditions within image frames 302, 304, 306.

In certain implementations, the one or more image statistics 310 include a pixel mean value for each of the first image frame 302 and the third image frame 306, a related value (such as a lux index) for the first image frame 302 and the third image frame 306, or a combination thereof. Pixel mean values may represent the average brightness level of the pixels in an image frame, and lux indices may quantify the illumination observed in the frame. In one example, a pixel mean value for an image frame may be determined by averaging the pixel intensity values across the entire image frame. In another example, a lux related value for an image frame may be determined by converting pixel intensity values to a standardized illumination level, which may be averaged across the entire image frame.

In certain implementations, the one or more image statistics 310 are determined as part of image statistic histograms for the first image frame 302 and the third image frame 306. In such implementations, the ISP 212 may determine the one or more image statistics 310 as part of the regular image processing for received images, and the image statistics 310 may be further used to detect and account for windshield wipers.

In certain implementations, determining the probability value 308 includes determining that the difference 312 between the image statistics 310 for the image frames 302, 306 exceeds a predetermined threshold value. In certain implementations, the difference 312 may include a difference measure between the image statistics 310 (such as an arithmetic difference between values, a percentage, a weighted difference, and the like). In certain implementations, the predetermined threshold value may be selected based on lighting conditions in at least one of the first image frame 302 and the third image frame 306, such as based on image brightness for the image frame 306. In such instances, the threshold values may be adjusted dynamically depending on the overall brightness of the image, as indicated by one or more corresponding image statistics 310. For example, in a 12-bit image (where the maximum pixel value is 4095), if the pixel mean value is greater than or equal to 2000, a higher threshold may be used to detect significant drops in brightness that could indicate the presence of a wiper (such as a drop of 300 or more). Conversely, if the pixel mean value drops below 500, a lower threshold may be used (such as a drop of 50 or more). The threshold values may adjusted (e.g., linearly adjusted) between these values to accommodate varying lighting conditions between pixel mean values of 500 and 2000.

In certain implementations, multiple image frames may be used to detect windshield wipers rather than relying on a single image frame. For example, the ISP 212 may analyze multiple current image frames, multiple previous image frames, or a combination of both to identify the presence of the windshield wiper. In certain implementations, the first image frame 302 may be one of a first plurality of successive image frames, the third image frame 306 may be one of a second plurality of successive image frames. In such instances, determining the probability value 308 may include determining one or more image statistics 310 for the first plurality of image frames and the second plurality of image frames, determining a difference 312 between the one or more image statistics 310 for the first plurality of image frames and the second plurality of image frames, and determining the probability value 308 based on the difference 312. In certain implementations, the image statistics 310 and comparisons may be similar to those discussed above. For example, the pixel mean value can be used to assess the average brightness of a sequence of image frames by calculating the mean intensity of all pixels in each frame and combining the results across multiple frames. As another example, the lux related value can be calculated for multiple frames to determine changes in illumination by converting pixel intensity values to a standardized lux measurement and averaging these values over a series of frames.

In certain implementations, determining the probability value 308 includes determining, with a machine learning model, the probability value 308 based at least on the first image frame 302 and the third image frame 306. For example, one or more machine learning models may be applied to image statistics for the image frames 302, 306. In certain implementations, the model receives image frames 302, 306, or sequences of image frames, as input and may processes the image frames data to output a probability value indicating the likelihood of a windshield wiper's presence. In certain implementations, the machine learning model may be implemented by the ISP 212, or by another processor, such as the AI engine 224 of the processor 204.

For example, the machine learning model may be implemented as one or more machine learning models, including supervised learning models, unsupervised learning models, other types of machine learning models, and/or other types of predictive models. For example, the machine learning model may be implemented as one or more of a neural network, a transformer model, a decision tree model, a support vector machine, a Bayesian network, a classifier model, a regression model, and the like. The machine learning model may be trained based on training data to recognize and predict the presence of windshield wipers in image frames. For example, one or more training datasets may be used that contain labeled instances of windshield wipers. These datasets may comprise numerous examples of images featuring both the presence and absence of windshield wipers, allowing the model to learn distinguishing characteristics such as shapes, edges, movement patterns, and variations in brightness associated with windshield wipers. The training data sets may specify one or more expected outputs, such as the likelihood or probability of a windshield wiper being present. For example, the expected output might be a probability score indicating the presence of a windshield wiper in the image frame.

Parameters of the machine learning model may be updated based on whether the machine learning model generates correct outputs when compared to the expected outputs. In particular, the machine learning model may receive one or more pieces of input data from the training data sets that are associated with a plurality of expected outputs. The machine learning model may generate predicted outputs based on a current configuration of the machine learning model. The predicted outputs may be compared to the expected outputs and one or more parameter updates may be computed based on differences between the predicted outputs and the expected outputs. In particular, the parameters may include weights (e.g., priorities) for different features and combinations of features (e.g., shapes of wiper blades, edge patterns, movement streaks, brightness variations). The parameter updates to the machine learning model may include updating one or more of the features analyzed and/or the weights assigned to different features or combinations of features (e.g., relative to the current configuration of the machine learning model).

In certain implementations, other methods may be used to determine the probability values 308 from those discussed above. For example, a percentage change in one of the image statistics 310, such as the pixel mean value, may be calculated to indicate a significant variation that could be caused by a windshield wiper. As another example, temporal analysis could be employed to track changes over a series of frames, identifying patterns consistent with wiper movement. As a further example, edge detection algorithms could be used to identify sudden changes in the image that correspond with the shape of a wiper.

The ISP may be configured to determine a time filter 316 based on the probability value 308. The ISP 212 may also be configured to determine an output image frame 318 by tone mapping a second image frame 304 according to the time filter 316.

In certain implementations, tone mapping may include converting the high dynamic range (HDR) of an input image to a lower dynamic range suitable for display or further processing, typically by reducing the bit depth. This process includes dynamically adjusting the tone mapping to account for varying lighting conditions in the image. For instance, in darker scenes, the tone mapping algorithm may enhance the visibility of shadowed regions by increasing the brightness levels, and allocating more of the available bits to represent darker tones. In brightly lit scenes, the algorithm may reduce brightness levels to preserve details in the highlights, allocating more bits to the brighter parts of the image. In certain implementations, the second image frame 304 may be in a first bit depth and tone mapping the at least one second image frame 304 includes determining, based on the second image frame 304, the output image frame 318 in a second bit depth that may be less than the first bit depth. For instance, the first bit depth may be 20 bits, and the second bit depth may be 12 bits. In additional or alternative implementations, other common bit depths might include a first bit depth of 16 bits and a second bit depth of 10 bits, or a first bit depth of 14 bits and a second bit depth of 8 bits. In certain implementations, the tone mapping can include local tone mapping, global tone mapping, or a combination thereof. Global tone mapping processes the image as a whole, applying consistent adjustments across the entire image frame. For example, global tone mapping might reduce the overall brightness of an image to ensure that none of the highlights are overexposed. Local tone mapping, may process portions of the image individually. For instance, local tone mapping might brighten dark shadows in a specific area of the image without affecting the well-lit regions, thereby preserving detail in both shadow and highlight areas.

In certain implementations, tone mapping the second image frame 304 according to the time filter 316 includes adjusting an influence of the first image frame 302 on the tone mapping of the second image frame 304. In certain implementations, the influence of the first image frame 302 refers to the way in which its characteristics affect the tone mapping parameters applied to subsequent image frames. This influence can be comprehensive, encompassing various factors such as lighting conditions, contrast levels, and detected obstructions. For example, if the first image frame 302 includes specific image statistics, such as pixel mean values and lux indices, these statistics can determine the selection of tone mapping parameters for the second image frame 304. Specifically, if the pixel mean value indicates a darker frame due to an obstruction like a windshield wiper, the system may assign less weight to this frame to prevent abrupt changes in overall brightness.

In certain implementations, tone mapping the second image frame 304 includes performing the tone mapping based on at least one third image frame 306, the third image frame 306 was captured before the first image frame 302. In certain implementations, this can include performing tone mapping according to image statistics 310 (e.g., lighting conditions) of one or more earlier image frames. For example, the system may use the image statistics from the immediately preceding image frame or from the closest previous frame in which a windshield wiper was not detected (such as the third image frame 306). If the first image frame 302 is obstructed by a windshield wiper, the tone mapping process 314 may instead be performed based on statistics for an earlier image frame (such as the third image frame 306). In certain implementations, performing the tone mapping process can include excluding the first image frame 302 when determining tone mapping parameters. For example, if the first image frame 302 is largely obscured by the wiper, the system might disregard image statistics 310 for the first image frame 302 and may instead use image statistics for the third image frame 306. Alternatively, the ISP 212 may merge or blend the image statistics 310 of both the first image frame 302 and the third image frame 306 to create a composite set of statistics.

In certain implementations, the tone mapping may be performed according to a tone mapping process 314. In such instances, determining the time filter 316 based on the probability value 308 may include determining an adjusted first filter value based on a first filter value for the tone mapping process 314 based on the probability value 308, determining the time filter 316 (*i*) a historical pixel mean of the tone mapping process 314, (ii) a previous time filter 316 value of the tone mapping process 314 (iii) the adjusted first filter value. In certain implementations, the time filter 316 may be an infinite input response (IIR) filter for the tone mapping process 314. For example, time filters for the tone mapping process when no windshield wiper is detected may be determined as:

$$FiltEcRoiMean = EcRoiMean * filtW + FiltEcRoiMean * (1 - filtW)$$

where:

FiltEcRoiMean is the filtered pixel mean value used by the tone mapping process.

EcRoiMean is the current pixel mean value.

filtW is a tunable filter speed parameter.

In instances where a windshield wiper is detected with a high enough probability value, the time filter 316 may be determined as:

$$FiltEcRoiMean = EcRoiMean * filtWNew + FiltEcRoiMean * (1 - filtWNew)$$

where:

filtWNew is the modified filter value, and is determined based on the probability value 308 (wiperProbability) as:

$$filtWNew = filtW * (1 - wiperProbability)$$

In certain implementations, the second image frame 304 may be captured after the first. In certain implementations, the tone mapping and exposure control determinations can experience a delay in processing, typically ranging from 2-3 frames. Consequently, the image statistics 310 and lighting conditions of the first image frame 302 may be used to perform tone mapping for subsequent frames. For example, if there is a delay of three frames, the lighting conditions detected in the first image frame 302 will influence the tone mapping parameters of the third image frame captured after the first image frame 302.

Figure 4A:
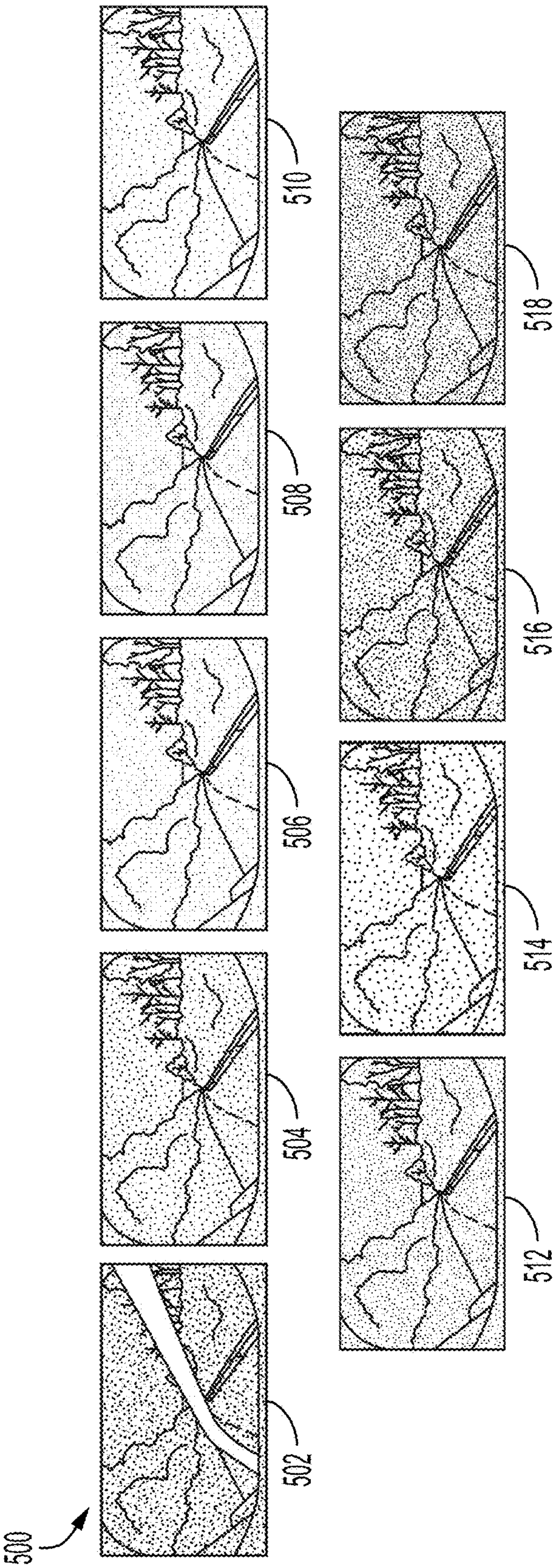
FIG. 4A illustrates a sequence of image frames according to one aspect of the present disclosure.

FIG. 4A illustrates a sequence 500 of image frames according to one aspect of the present disclosure. The sequence 500 demonstrates the effect of a windshield wiper on global tone mapping and the subsequent flickering in the video output without windshield wiper detection. The sequence includes image frames 502, 504, 506, 508, 510, 512, 514, 516, and 518. Frame 502 shows an image with a windshield wiper passing through the field of view. The presence of the wiper makes the pixel mean value darker. This lowered pixel mean value is due to the significant obstruction of the wiper blade in the image. Frames 504 and 506 continue to show images, progressively show the scene as the windshield moves out of frame. However, because the pixel mean value in frame 502 was significantly reduced due to the wiper, the tone mapping algorithm compensates for the next few frames. In particular, frame 508 shows this compensation. Due to a three-frame delay in the tone mapping process, the tone mapping process lightens the image to adjust for the darker pixel mean value observed in frame 502. This results in frame 508 being significantly brighter than frames 502-506. Frames 510, 512, and 514 illustrate the gradual adjustment process facilitated by the time filter. Eventually, by frames 516 and 518, the tone mapping has returned to the earlier settings that were disrupted by the windshield wiper. When this process is repeated for each movement of the windshield wiper, it can create a flicker in the resulting video feed, as discussed above.

Figure 4B:
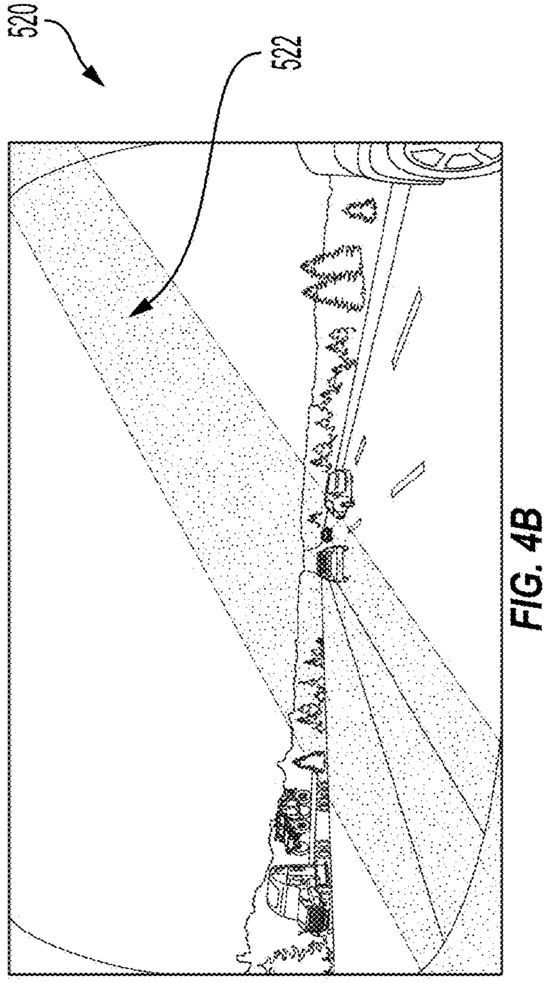
FIG. 4B illustrates an image frame processed using local tone mapping according to one aspect of the present disclosure.

FIG. 4B illustrates an image frame 520 processed using local tone mapping according to one aspect of the present disclosure. The image frame 520 shows a scene where a windshield wiper temporarily obstructs the view prior to capturing the image frame 520, leading to localized changes in brightness and contrast when tone mapping is applied to the image frame 520 without windshield wiper detection. The presence of the wiper creates a dark region in the earlier image frame, affecting the pixel mean values within this area. The local tone mapping algorithm identifies this darker region and attempts to adjust its brightness and contrast independently from the rest of the image in the later image frame 520. As a result, the local tone mapping process can cause visual artifacts 522, such as sudden changes in brightness levels, around the region of the wiper's path within the image frame 520.

Figure 4C:
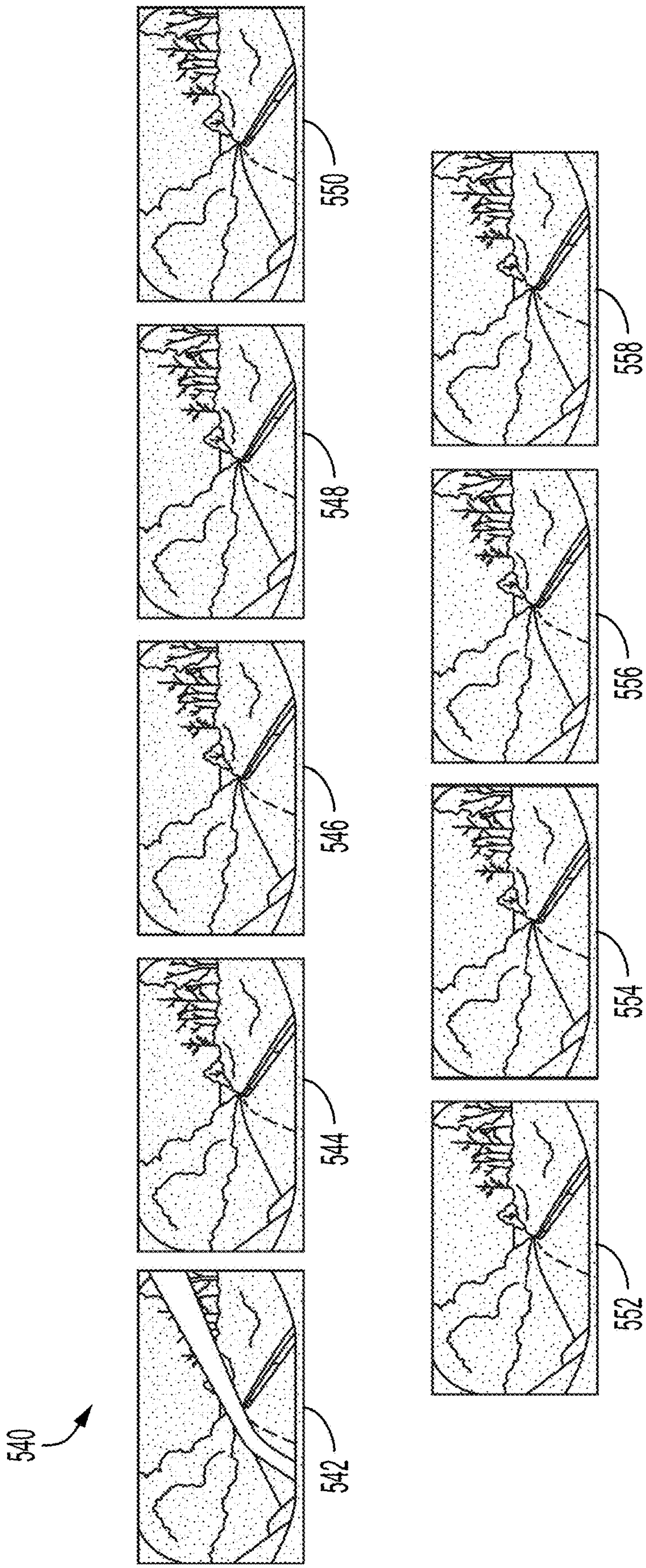
FIG. 4C illustrates a sequence of image frames according to one aspect of the present disclosure.

FIG. 4C illustrates a sequence 540 of image frames according to one aspect of the present disclosure. The sequence 540 demonstrates the ability of the described windshield wiper detection techniques to account for windshield wipers in the tone mapping process. The sequence includes image frames 542, 544, 546, 548, 550, 552, 554, 556, and 558. Frame 542 shows an image with a windshield wiper passing through the field of view. The presence of the wiper makes the pixel mean value darker, lowering the pixel mean value. Frames 544 and 546 progressively show the scene as the windshield moves out of frame. Frame 548 shows the results of the improved tone mapping process. In particular, the windshield wiper is detected in frame 542 and accounted for in the tone mapping process, so that frame 548 does not show the pronounced brightness adjustment from frame 508. Frames 550, 552, and 554 further demonstrate the effectiveness of the time filter in maintaining consistent tone mapping across the sequence. Finally, by frames 556 and 558, the images maintain their consistent brightness levels throughout the sequence. Thus, the above-described techniques can improve the quality of the resulting images and reduce the flickering cased by windshield wipers in tone mapping applications.

Figure 5:
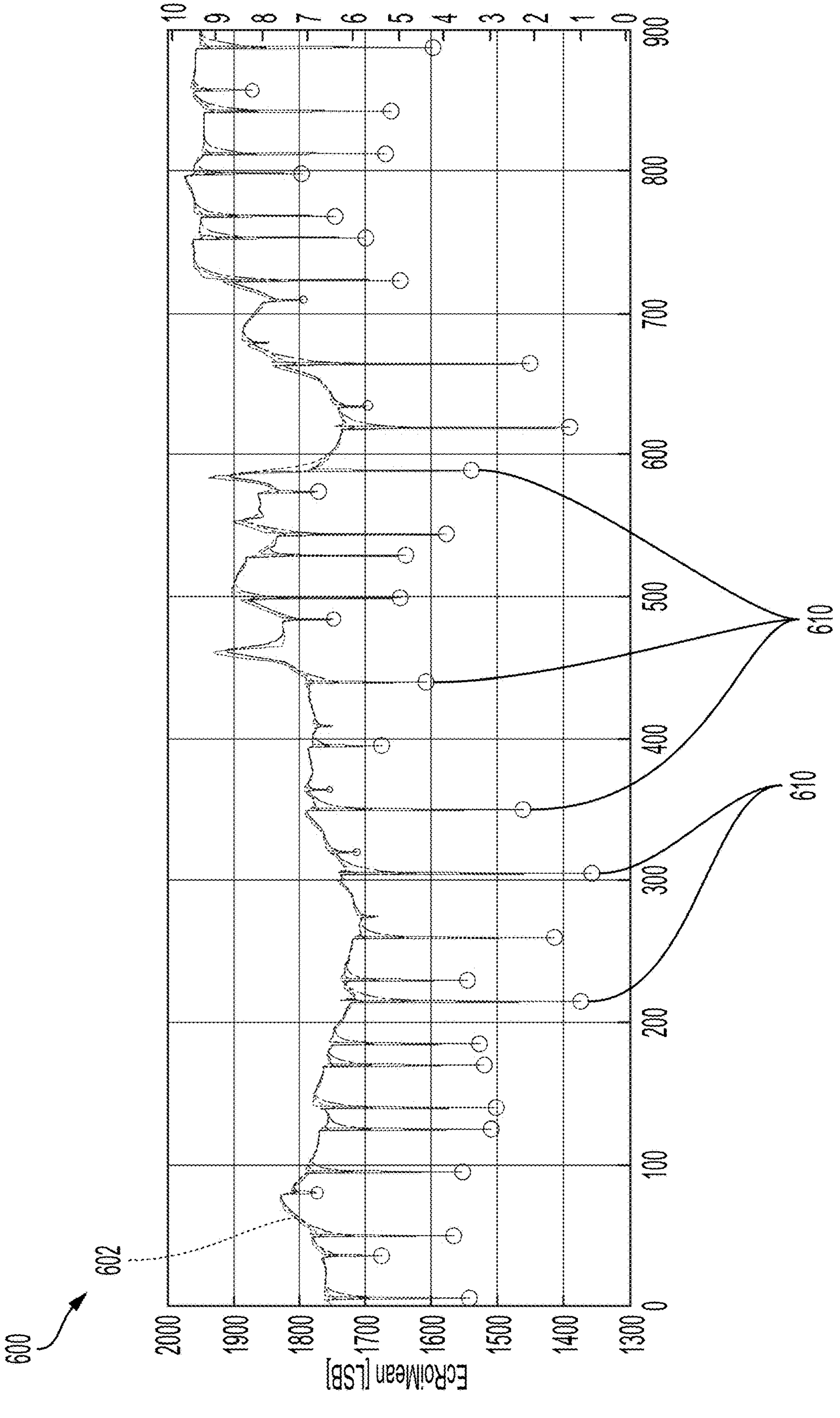
FIG. 5 is a plot of image statistics according to one aspect of the present disclosure.

FIG. 5 is a plot 600 of image statistics according to one aspect of the present disclosure. In particular, the plot 600 shows pixel mean values 602 over time (measured in frame indices). The plot 600 also indicates detected windshield wipers in image frames, indicated using circles 610. For example, there are significant drops in the pixel mean values corresponding to detected windshield wipers.

Figure 6:
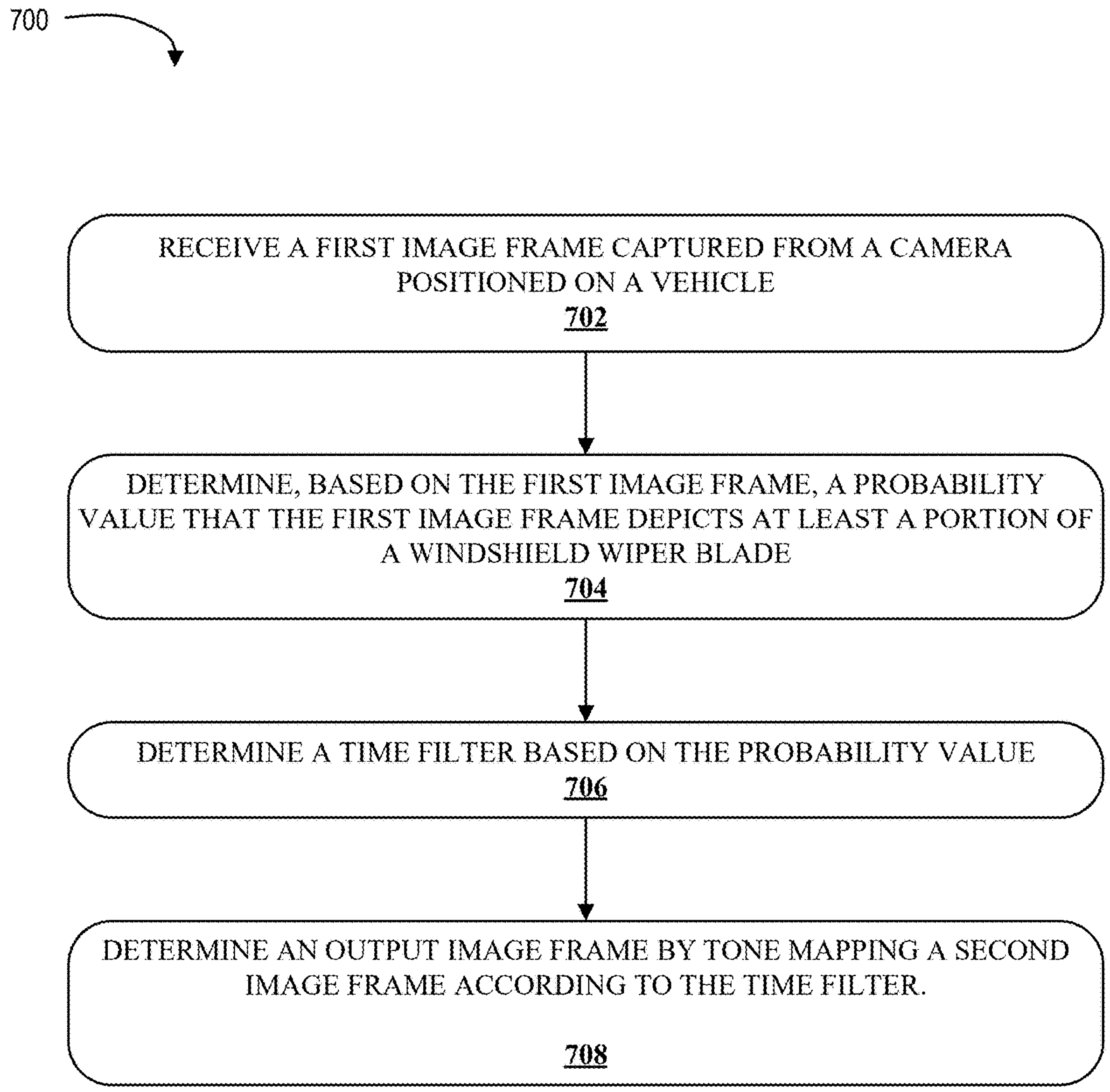
FIG. 6 is a flow chart illustrating an example method for tone mapping control with windshield wiper detection.

One method of performing image processing according to embodiments described above is shown in FIG. 6. FIG. 6 is a flow chart illustrating an example method 700 for tone mapping control with windshield wiper detection. The method may be performed by one or more of the above systems, such as the systems 100, 200, 300.

The method 700 includes receiving a first image frame captured from a camera positioned on a vehicle (block 702). For example, the ISP 212 may receive a first image frame 302 captured from a camera positioned on a vehicle.

The method 700 includes determining, based on the first image frame, a probability value that the first image frame depicts at least a portion of a windshield wiper blade (block 704). For example, the ISP 212 may determine, based on the first image frame 302, a probability value 308 that the first image frame 302 depicts at least a portion of a windshield wiper blade. In certain implementations, the probability value 308 may be determined based on the first image frame 302 and a third image frame 306. In such instances, the third image frame 306 may be captured before the first image frame 302. In certain implementations, determining the probability value 308 may include determining one or more image statistics 310 for the first image frame 302 and the third image frame 306, determining a difference 312 between the one or more image statistics 310 for the first image frame 302 and the third image frame 306, and determining the probability value 308 based on the difference 312. In certain implementations, the one or more image statistics 310 include a pixel mean value for each of the first image frame 302 and the third image frame 306, a lux related value for the first image frame 302 and the third image frame 306, or a combination thereof. In certain implementations, the one or more image statistics 310 are determined as part of image statistic histograms for the first image frame 302 and the third image frame 306. In certain implementations, determining the probability value 308 includes determining that the difference 312 exceeds a predetermined threshold value. In certain implementations, the predetermined threshold value may be selected based on lighting conditions in at least the third image frame 306. In certain implementations, the first image frame 302 may be one of a first plurality of successive image frames, the third image frame 306 may be one of a second plurality of successive image frames. In such instances, determining the probability value 308 may include determining one or more image statistics 310 for the first plurality of image frames and the second plurality of image frames, determining a difference 312 between the one or more image statistics 310 for the first plurality of image frames and the second plurality of image frames, and determining the probability value 308 based on the difference 312. In certain implementations, determining the probability value 308 includes determining, with a machine learning model, the probability value 308 based at least on the first image frame 302 and the third image frame 306.

The method 700 includes determining a time filter based on the probability value (block 706). For example, the ISP 212 may determine a time filter 316 based on the probability value 308.

The method 700 includes determining an output image frame by tone mapping a second image frame according to the time filter (block 708). For example, the ISP 212 may determine an output image frame 318 by tone mapping a second image frame 304 according to the time filter 316.

In certain implementations, the second image frame 304 may be in a first bit depth. In such instances, tone mapping the at least one second image frame 304 may include determining, based on the second image frame 304, the output image frame 318 in a second bit depth that may be less than the first bit depth. In certain implementations, tone mapping the second image frame 304 according to the time filter 316 includes adjusting an influence of the first image frame 302 on the tone mapping of the second image frame 304. In certain implementations, tone mapping the second image frame 304 includes performing the tone mapping based on at least one third image frame 306, the third image frame 306 was captured before the first image frame 302.

In certain implementations, the tone mapping may be performed according to a tone mapping process 314. In such instances, determining the time filter 316 based on the probability value 308 may include determining an adjusted first filter value based on a first filter value for the tone mapping process 314 based on the probability value 308 value 308, determining the time filter 316 based on (i) a historical pixel mean of the tone mapping process 314, (ii) a previous time filter 316 value of the tone mapping process 314 (iii) the adjusted first filter value. In certain implementations, the time filter 316 may be an infinite input response (IIR) filter for the tone mapping process 314.

It is noted that one or more blocks (or operations) described with reference to FIG. 6 may be combined with one or more blocks (or operations) described with reference to another of the figures. For example, one or more blocks (or operations) of FIG. 6 may be combined with one or more blocks (or operations) of FIG. 1-3. As another example, one or more blocks associated with FIG. 6 may be combined with one or more blocks associated with FIG. 3.

In one or more aspects, techniques for supporting vehicular operations may include additional aspects, such as any single aspect or any combination of aspects described below or in connection with one or more other processes or devices described elsewhere herein.

A first aspect provides a method for image processing for use in a vehicle assistance system that includes receiving a first image frame captured from a camera positioned on a vehicle; determining, based on the first image frame, a probability value that the first image frame depicts at least a portion of a windshield wiper blade; determining a time filter based on the probability value; and determining an output image frame by tone mapping a second image frame according to the time filter.

In a second aspect, in combination with the first aspect, the probability value is determined based on the first image frame and a third image frame, wherein the third image frame was captured before the first image frame.

In a third aspect, in combination with the second aspect, determining the probability value comprises determining one or more image statistics for the first image frame and the third image frame; determining a difference between the one or more image statistics for the first image frame and the third image frame; and determining the probability value based on the difference.

In a fourth aspect, in combination with the third aspect, the one or more image statistics include a pixel mean value for each of the first image frame and the third image frame, a lux related value for the first image frame and the third image frame, or a combination thereof.

In a fifth aspect, in combination with the fourth aspect, the one or more image statistics are determined as part of image statistic histograms for the first image frame and the third image frame.

In a sixth aspect, in combination with one or more of the third aspect through the fifth aspect, determining the probability value comprises determining that the difference exceeds a predetermined threshold value, wherein the predetermined threshold value is determined based on lighting conditions in at least one of the first image frame and the third image frame.

In a seventh aspect, in combination with one or more of the second aspect through the sixth aspect, the first image frame is one of a first plurality of successive image frames, and the third image frame is one of a second plurality of successive image frames. Determining the probability value comprises determining one or more image statistics for the first plurality of successive image frames and the second plurality of successive image frames; determining a difference between the one or more image statistics for the first plurality of image frames and the second plurality of image frames; and determining the probability value based on the difference.

In an eighth aspect, in combination with one or more of the first aspect through the seventh aspect, tone mapping the second image frame according to the time filter comprises adjusting an influence of the first image frame on the tone mapping of the second image frame.

In a ninth aspect, in combination with one or more the first aspect through the eighth aspect, the tone mapping is performed according to a tone mapping process. Determining the time filter based on the probability value comprises determining an adjusted first filter value based on a first filter value for the tone mapping process based on the probability value; and determining the time filter from (i) a historical pixel mean of the tone mapping process, (ii) a previous time filter value of the tone mapping process, and (iii) the adjusted first filter value.

In a tenth aspect, in combination with one or more of the first aspect through the ninth aspect, the second image frame is in a first bit depth. Tone mapping the second image frame comprises determining, based on the second image frame, the output image frame in a second bit depth that is less than the first bit depth.

In an eleventh aspect, in combination with one or more the first aspect through the tenth aspect, the second image frame is captured after the first image frame.

A twelfth aspect provides an apparatus that includes a memory storing processor-readable code and at least one processor coupled to the memory. The at least one processor is configured to execute the processor-readable code to cause the at least one processor to perform operations including receiving a first image frame captured from a camera positioned on a vehicle; determining, based on the first image frame, a probability value that the first image frame depicts at least a portion of a windshield wiper blade; determining a time filter based on the probability value; and determining an output image frame by tone mapping a second image frame according to the time filter. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirteenth aspect, in combination with the twelfth aspect, the probability value is determined based on the first image frame and a third image frame, wherein the third image frame was captured before the first image frame.

In a fourteenth aspect, in combination with the thirteenth aspect, determining the probability value comprises determining one or more image statistics for the first image frame and the third image frame; determining a difference between the one or more image statistics for the first image frame and the third image frame; and determining the probability value based on the difference.

In a fifteenth aspect, in combination with the fourteenth aspect, determining the probability value comprises determining that the difference exceeds a predetermined threshold value, wherein the predetermined threshold value is selected based on lighting conditions in at least one of the first image frame and the third image frame.

In a sixteenth aspect, in combination with one or more of the twelfth aspect through the fifteenth aspect, tone mapping the second image frame according to the time filter comprises adjusting an influence of the first image frame on the tone mapping of the second image frame.

A seventeenth aspect provides a vehicle that includes a camera, a memory storing processor-readable code, and at least one processor coupled to the memory. The at least one processor is configured to execute the processor-readable code to cause the at least one processor to perform operations including receiving a first image frame captured from the camera; determining, based on the first image frame, a probability value that the first image frame depicts at least a portion of a windshield wiper blade; determining a time filter based on the probability value; and determining an output image frame by tone mapping a second image frame according to the time filter.

In an eighteenth aspect, in combination with the seventeenth aspect, the probability value is determined based on the first image frame and a third image frame, wherein the third image frame was captured before the first image frame.

In a nineteenth aspect, in combination with the eighteenth aspect, determining the probability value comprises determining one or more image statistics for the first image frame and the third image frame; determining a difference between the one or more image statistics for the first image frame and the third image frame; and determining the probability value based on the difference.

In a twentieth aspect, in combination with one or more of the seventeenth aspect through the nineteenth aspect, tone mapping the second image frame according to the time filter comprises adjusting an influence of the first image frame on the tone mapping of the second image frame.

Components, the functional blocks, and the modules described herein with respect to FIGS. 1-3 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a vehicle assistance system, comprising:

receiving a first image frame captured from a camera positioned on a vehicle;

determining, based on the first image frame, a probability value that the first image frame depicts at least a portion of a windshield wiper blade;

determining a time filter based on the probability value; and determining an output image frame by tone mapping a second image frame according to the time filter.

2. The method of claim 1, wherein the probability value is determined based on the first image frame and a third image frame, wherein the third image frame was captured before the first image frame.

3. The method of claim 2, wherein determining the probability value comprises:

determining one or more image statistics for the first image frame and the third image frame;

determining a difference between the one or more image statistics for the first image frame and the third image frame; and determining the probability value based on the difference.

4. The method of claim 3, wherein the one or more image statistics include a pixel mean value for each of the first image frame and the third image frame, a lux related value for the first image frame and the third image frame, or a combination thereof.

5. The method of claim 4, wherein the one or more image statistics are determined as part of image statistic histograms for the first image frame and the third image frame.

6. The method of claim 3, wherein determining the probability value comprises determining that the difference exceeds a predetermined threshold value, wherein the predetermined threshold value is determined based on lighting conditions in at least one of the first image frame and the third image frame.

7. The method of claim 2, wherein the first image frame is one of a first plurality of successive image frames, wherein the third image frame is one of a second plurality of successive image frames, and wherein determining the probability value comprises:

determining one or more image statistics for the first plurality of successive image frames and the second plurality of successive image frames;

determining a difference between the one or more image statistics for the first plurality of image frames and the second plurality of image frames; and determining the probability value based on the difference.

8. The method of claim 1, wherein tone mapping the second image frame according to the time filter comprises adjusting an influence of the first image frame on the tone mapping of the second image frame.

9. The method of claim 1, wherein the tone mapping is performed according to a tone mapping process, and wherein determining the time filter based on the probability value comprises:

determining an adjusted first filter value based on a first filter value for the tone mapping process based on the probability value; and determining the time filter (i) a historical pixel mean of the tone mapping process, (ii) a previous time filter value of the tone mapping process; and (iii) the adjusted first filter value.

10. The method of claim 1, wherein the second image frame is in a first bit depth, and wherein tone mapping the second image frame comprises determining, based on the second image frame, the output image frame in a second bit depth that is less than the first bit depth.

11. The method of claim 1, wherein the second image frame is captured after the first image frame.

12. An apparatus, comprising:

a memory storing processor-readable code; and at least one processor coupled to the memory, the at least one processor configured to execute the processor-readable code to cause the at least one processor to perform operations including:

receiving a first image frame captured from a camera positioned on a vehicle;

determining, based on the first image frame, a probability value that the first image frame depicts at least a portion of a windshield wiper blade;

determining a time filter based on the probability value; and determining an output image frame by tone mapping a second image frame according to the time filter.

13. The apparatus of claim 12, wherein the probability value is determined based on the first image frame and a third image frame, wherein the third image frame was captured before the first image frame.

14. The apparatus of claim 13, wherein determining the probability value comprises:

determining one or more image statistics for the first image frame and the third image frame;

determining a difference between the one or more image statistics for the first image frame and the third image frame; and determining the probability value based on the difference.

15. The apparatus of claim 14, wherein determining the probability value comprises determining that the difference exceeds a predetermined threshold value, wherein the predetermined threshold value is selected based on lighting conditions in at least one of the first image frame and the third image frame.

16. The apparatus of claim 12, wherein tone mapping the second image frame according to the time filter comprises adjusting an influence of the first image frame on the tone mapping of the second image frame.

17. A vehicle, comprising:

a camera a memory storing processor-readable code; and at least one processor coupled to the memory, the at least one processor configured to execute the processor-readable code to cause the at least one processor to perform operations including:

receiving a first image frame captured from the camera;

determining, based on the first image frame, a probability value that the first image frame depicts at least a portion of a windshield wiper blade;

determining a time filter based on the probability value; and determining an output image frame by tone mapping a second image frame according to the time filter.

18. The vehicle of claim 17, wherein the probability value is determined based on the first image frame and a third image frame, wherein the third image frame was captured before the first image frame.

19. The vehicle of claim 18, wherein determining the probability value comprises:

determining one or more image statistics for the first image frame and the third image frame;

determining a difference between the one or more image statistics for the first image frame and the third image frame; and determining the probability value based on the difference.

20. The vehicle of claim 17, wherein tone mapping the second image frame according to the time filter comprises adjusting an influence of the first image frame on the tone mapping of the second image frame.

* * * * *